United States Patent [19]

Cocca

[11] Patent Number: 5,450,149
[45] Date of Patent: Sep. 12, 1995

[54] PHOTOGRAPHIC CAMERA AND METHOD FOR RECORDING MAGNETIC DATA ON FILM

[75] Inventor: J. David Cocca, Pittsford, N.Y.

[73] Assignee: Eastman Kodak Company, Rochester, N.Y.

[21] Appl. No.: 200,175

[22] Filed: Feb. 22, 1994

[51] Int. Cl.6 ............................................. G03B 17/24
[52] U.S. Cl. .................................................. 354/106
[58] Field of Search .................... 354/75, 76, 105, 106

[56] References Cited

U.S. PATENT DOCUMENTS 5,130,745  7/1992  Cloutier et al. ........................ 355/40

Primary Examiner—David M. Gray
Attorney, Agent, or Firm—Francis H. Boos, Jr.

[57] ABSTRACT

A method and camera apparatus for magnetically recording data on a photographic film magnetic layer in dual parallel data tracks wherein a first data track is recorded as the film is transported in one direction and a second data track is recorded as the film is transported in the reverse direction. In this manner, recording is simplified since only one recording track of a recording head is needed for recording in the dual data tracks and memory requirements are minimized by recording high content data as each frame is exposed, leaving the low content data to be stored in memory for recording during rewind of film into the cassette.

9 Claims, 6 Drawing Sheets

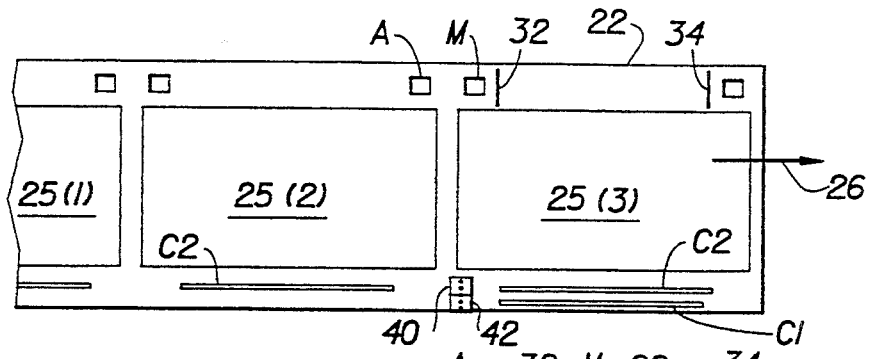
FIG. 4a
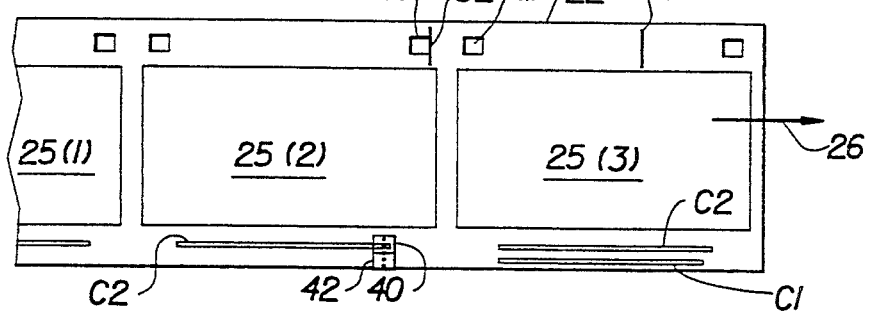
FIG. 4b
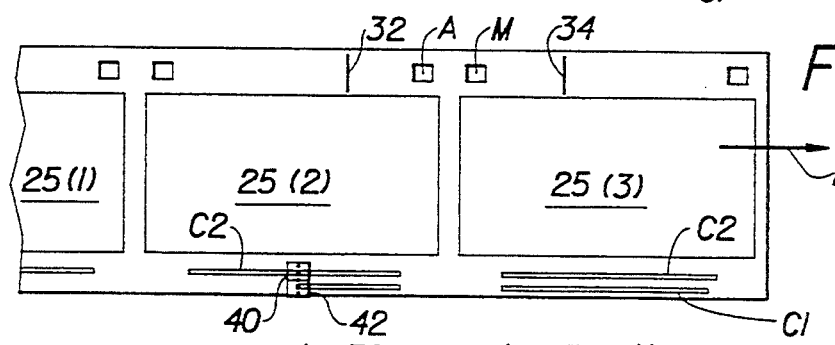
FIG. 4c
FIG. 4d
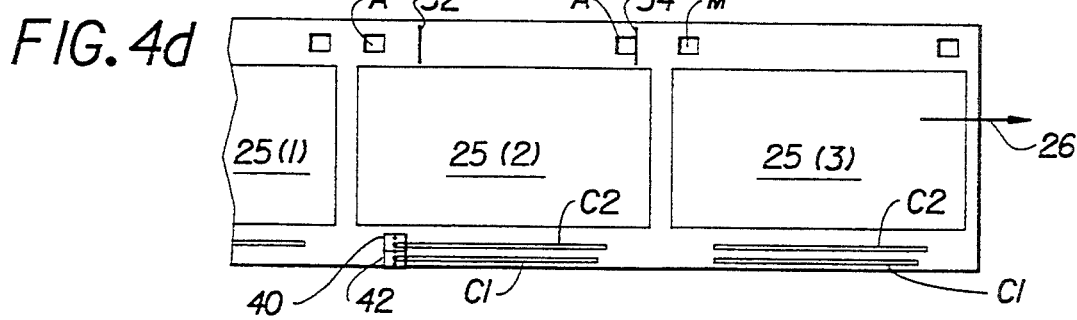
FIG. 4e
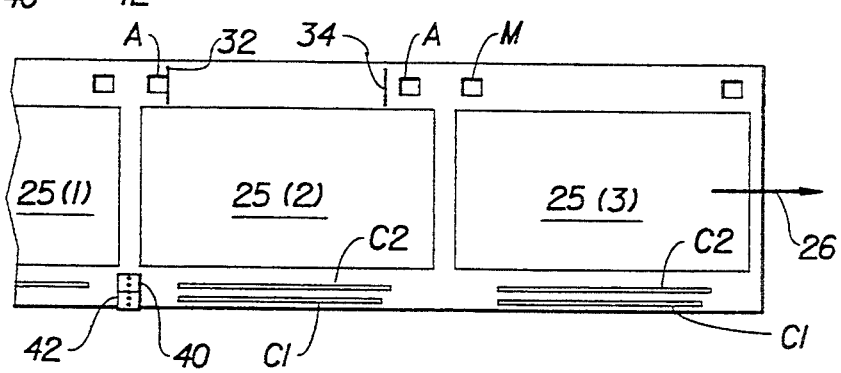

PHOTOGRAPHIC CAMERA AND METHOD FOR RECORDING MAGNETIC DATA ON FILM

FIELD OF INVENTION

This invention relates to the field of photographic film cameras and more specifically to cameras adapted to magnetically record data onto a magnetic layer on photographic film.

BACKGROUND

Cameras have been described in which various forms of photographic data are recorded in parallel tracks on magnetic layers formed on photographic film strips in the camera. A representative example is found in commonly assigned U.S. Pat. No. 5,130,745 in which four camera dedicated tracks are recorded, two on each side of the film strip. More recently, it has been proposed to use only two camera tracks along one edge of the film strip and to reserve two tracks on the other edge for photofinisher use. Such a camera with multiple magnetic tracks writing capability is generally adapted to write both tracks at the same time during film transport either in the film advance direction or in the film rewind direction. In either case, there are complications in power consumption and magnetic circuit drive "head room" (particularly in a three-volt battery system camera) as well as separate recording drive circuit and added software timing and calculation requirements. If recording is performed in the rewind direction after all image frames have been exposed, there is the further complication that a large amount of nonvolatile memory is required in order to store all of the data from each exposed frame until rewind occurs.

In a proposed camera data recording system involving parallel recorded data tracks, one of the recorded tracks is reserved for camera information such as date, time, flash fire, image orientation and frame aspect ratio format designation. This is relatively simple information that can be recorded in, for example, six bytes of data. In this proposed system, a second track is reserved to record annotation data, such as a "print title". This data is the sort that is inputted by the camera user for recording on the film to be subsequently read back at the photofinisher and printed on the back of the photographic print. This annotated information is relatively high in content and would typically require about 30 bytes of data to be recorded on the film. Thus, it would require significant nonvolatile memory to store all of the data for each of the frames on the film if this data were to be stored for recording during the rewind operation.

It is, therefore, seen to be desirable to provide a method of recording data in a photographic film camera within plural tracks on the film that alleviates problems associated with simultaneously recording the data on the plural tracks and also alleviates the need for extensive nonvolatile memory that would be required to store all of the data for recording during the rewind operation.

SUMMARY OF THE INVENTION

Thus in accordance with the invention, there is provided a photographic camera and method of recording first and second sets of photographic data by means of a magnetic recording device into parallel data tracks in a magnetic recording layer formed on photographic film, wherein a first data set associated with an image frame is recorded in a first data track on film as the film is transported in a first direction and a second data set associated with the image frame is recorded in a second data track on the film, as the film is transported in a second direction opposite to the first direction. Preferably the data bits are recorded in reverse sequence in one data track versus the recording sequence in the other data track so that, upon subsequent reading of the data, at a photofinisher station, for example, the data sets from both data tracks are readable simultaneously while the film is being transported in a single direction without further processing being required to re-sequence data bits in one track.

Such a recording method has the advantage that data in one track can be recorded during advance of the film to the next available image frame, with data in the other track being recorded during the rewind operation, thus simplifying the recording operation. Additionally, by recording high content data during the film advance phase and storing only the low content data for recording during the rewind phase, a significant savings is accomplished in the required amount of nonvolatile memory. Additionally, during rewind, jitter in the film transport speed can introduce errors in recording. By reserving the low content data (i.e. shorter data blocks) to recording in the rewind direction, redundant recording can be employed to minimize the introduction of errors in the data readback process.

BRIEF DESCRIPTION OF THE DRAWINGS

In the drawings:

FIGS. 4a–4e illustrate the recording steps on the same film segment during recording of data in a rewind direction on the film.

DETAILED DESCRIPTION

Figure 1:
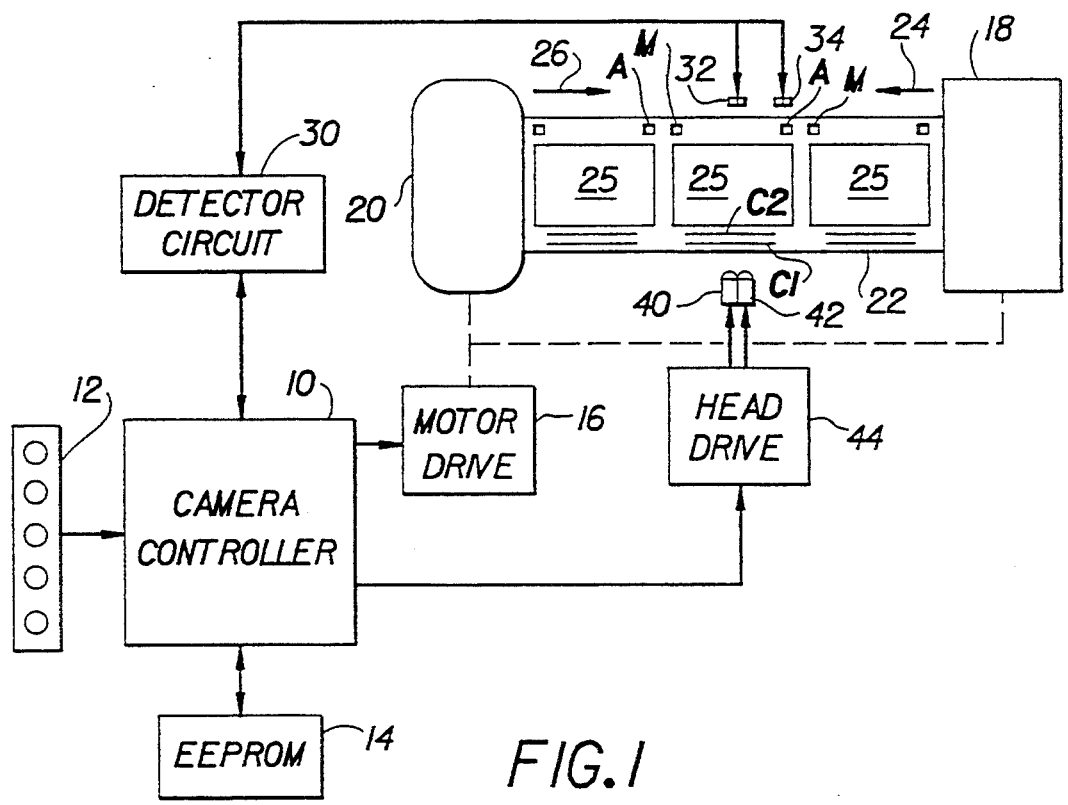
FIG. 1 is schematic illustration of portions of a camera adapted for the method of the present invention utilizing two recording heads.

Referring now to FIG. 1, portions of a photographic camera associated with magnetic recording of data on film in accordance with the present invention is shown. A camera controller 10 includes a microprocessor and related input/output and control circuits to control various functions of the camera operation. An input device 12 is provided to allow the camera user to input data such as an image frame title to controller 10. Other photographic data, such as date, time, exposure information, scene orientation and frame format are provided in known manner to controller 10 from various sensors (not shown) in the camera. An EEPROM 14 comprises a non-volatile data storage medium for storing the photographic data temporarily prior to recording of the data onto a film magnetic layer formed on photographic film 22. A motor drive 16 is mechanically coupled to an internal spool of film cassette 18 and to a takeup spool 20. The motor drive is operated under the control of controller 10 to advance film strip 22 in a first direction represented by arrow 24 from the cassette to the takeup spool, frame by frame, as each image frame 25 is exposed. Once all frames are exposed, motor drive 16 is operative to rewind the film in a second direction represented by arrow 26 from the takeup spool to the film cassette in one continuous motion. A detector circuit 30 is coupled between controller 10 and opto-sensors 32 and 34 to sense apertures A and M to control the frame by frame advance of the film and the recording of data in tracks C1 and C2 in accordance with the present invention. In conjunction with detector 30 and controller 10, opto-sensor 32 serves as a metering sensor responsive to detection of metering perf M to position image frame areas 25 properly within the camera exposure gate (not shown). Opto-sensor 34 serves as a velocity sensor responsive to detection of anticipation perf A to sense the velocity of the film as it is being transported. Data recording in parallel longitudinal data tracks C1 and C2 is accomplished by means of recording heads 40 and 42 driven by head drive 44 under the control of controller 10. Since, as will be seen subsequently, only one head recording track is actuated at a time in accordance with a feature of the invention, head drive 44 may comprise a 1.5H-drive circuit of known design rather than two separate H drive circuits. The details of film 22 and the magnetic recording layer thereon are fully described in aforementioned U.S. Pat. No. 5,130,745, the disclosure of which is incorporated herein by reference.

Figures 2, 7:
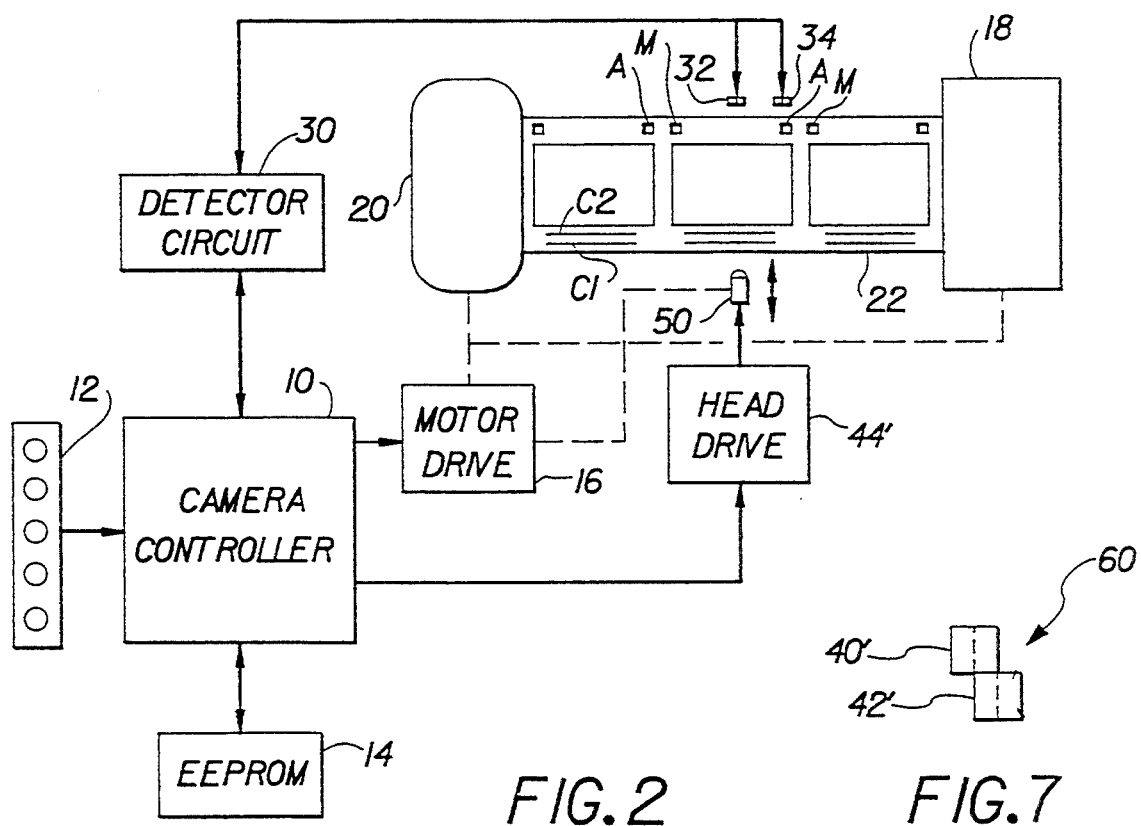
FIG. 2 is a schematic illustration of an alternative camera embodiment utilizing a single recording head for the method of the invention.
FIG. 7 is an alternative embodiment of a recording head for the camera of FIG. 1.

In FIG. 2, an alternative camera embodiment is shown in which like components carry the same reference numerals as the camera of FIG. 1. The FIG. 2 camera differs in that, since only one data track is being recorded at a time, a single recording head 50 is used in place of the dual head 40,42 in FIG. 1. suitable mechanical switching (not shown) is provided to move head 50 between the two track recording positions. Also, since only a single recording head is used, head drive 44' comprises a single H-drive circuit of known design in place of the 1.5H-drive circuits 44 of the FIG. 1 embodiment.

Figure 3A:
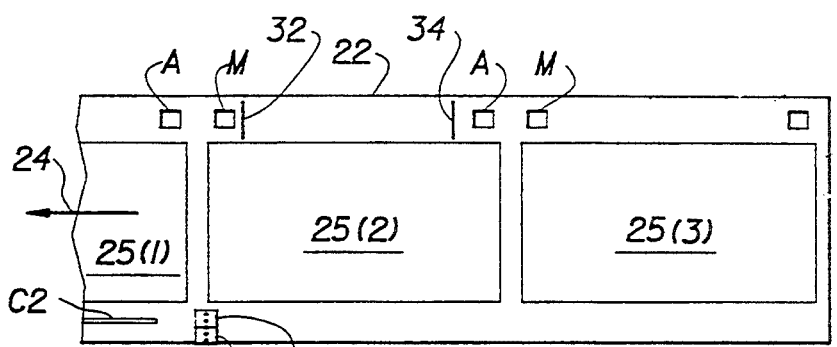
FIGS. 3a–3e illustrate the recording steps on a film segment during recording of data in a film advance direction on the film.

Referring now jointly to FIG. 1 and FIGS. 3a–3e and FIG. 5, the method by which data is recorded on film 22 during film advance by the camera apparatus in accordance with the invention will now be described. As shown in FIG. 3a, the camera is assumed to have completed a frame advance in the direction of arrow 24 after exposure of frame 25(1) with the film metered into positions for exposure of frame 25(2). Data has been recorded in data track C2 adjacent frame 25(1). The relative positions of the opto-sensors 32,34 and record heads 40,42 to the apertures A,M and to the image frame 25(2) are as shown when the film is positioned for exposure of frame 25(2). Once the frame is exposed, the controller program in FIG. 5 enters the frame advance cycle at 100 and at step 102 starts the transport motor in the advance direction shown by arrow 24.

Figure 3B:
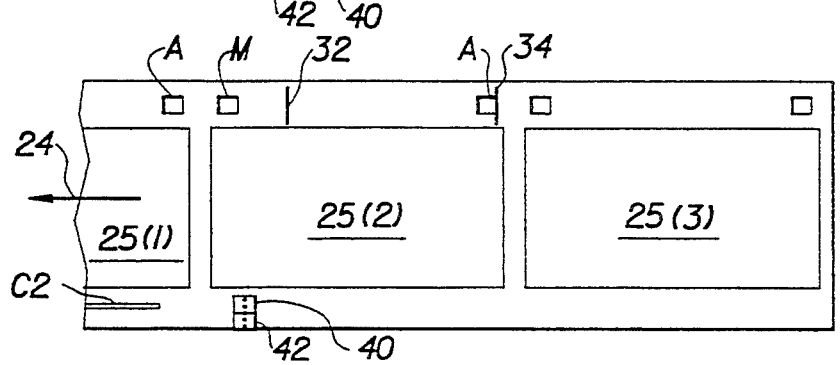
Figure 3C:
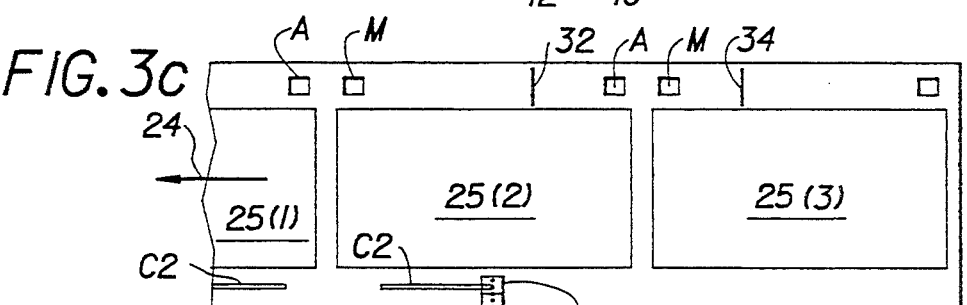
Figure 3D:
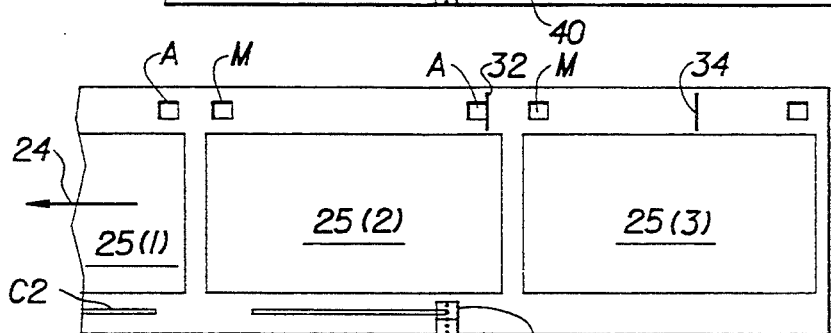
Figure 3E:
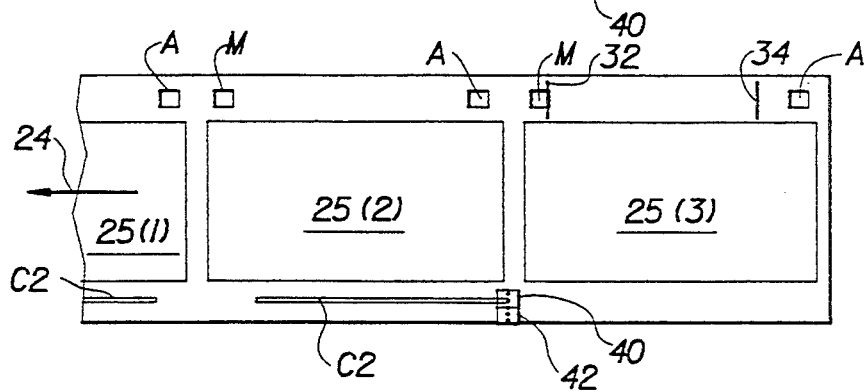
Figure 5:
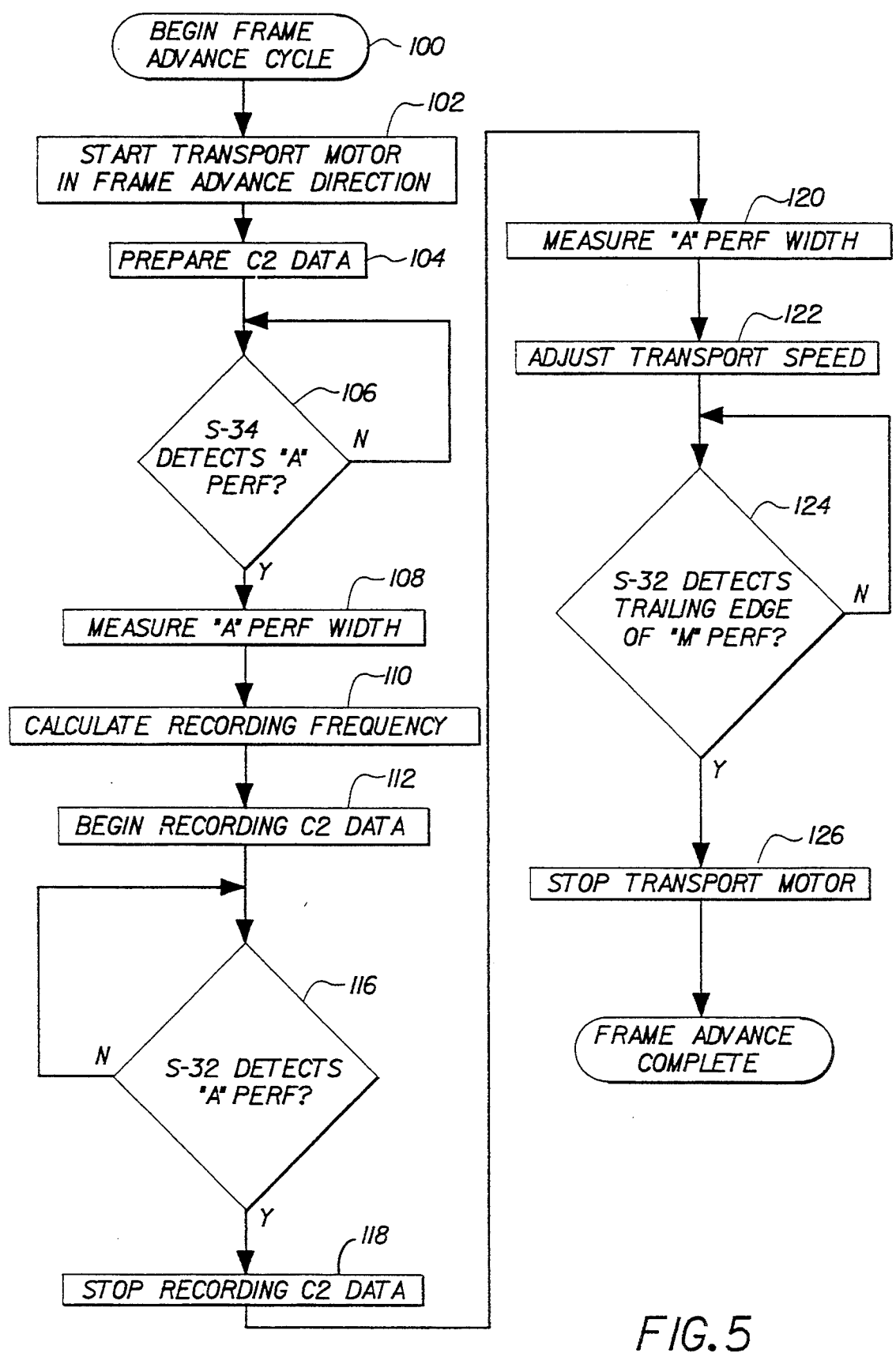
FIG. 5 is a program flow chart associated with the illustrations of FIG. 3 used in the recording of data during the film advance cycle.
Figure 6A:
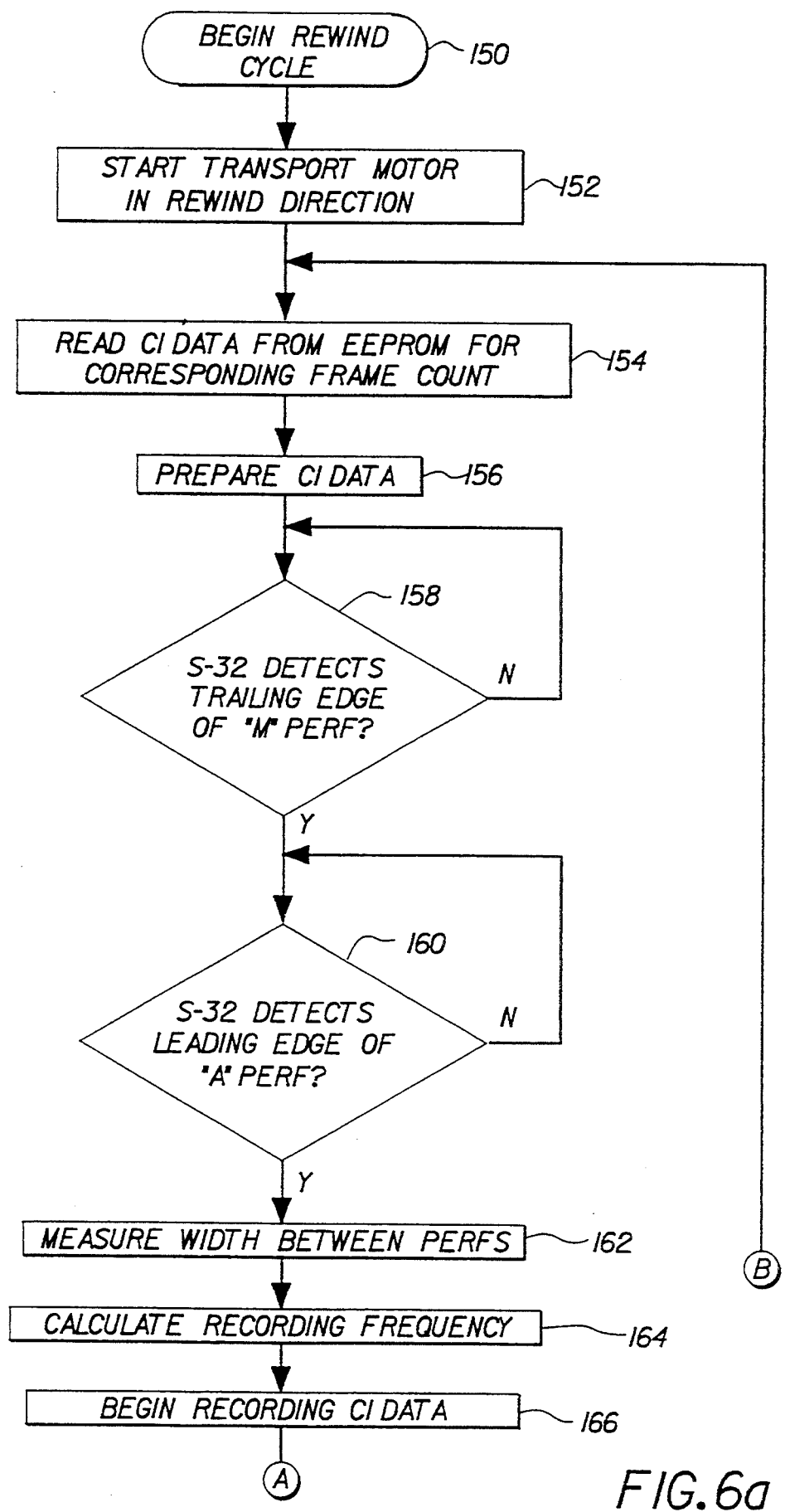
FIGS. 6a and 6b are successive segments of a program flow chart associated with the illustrations of FIG. 4 used the recording of data during the film rewind cycle.
Figure 6B:
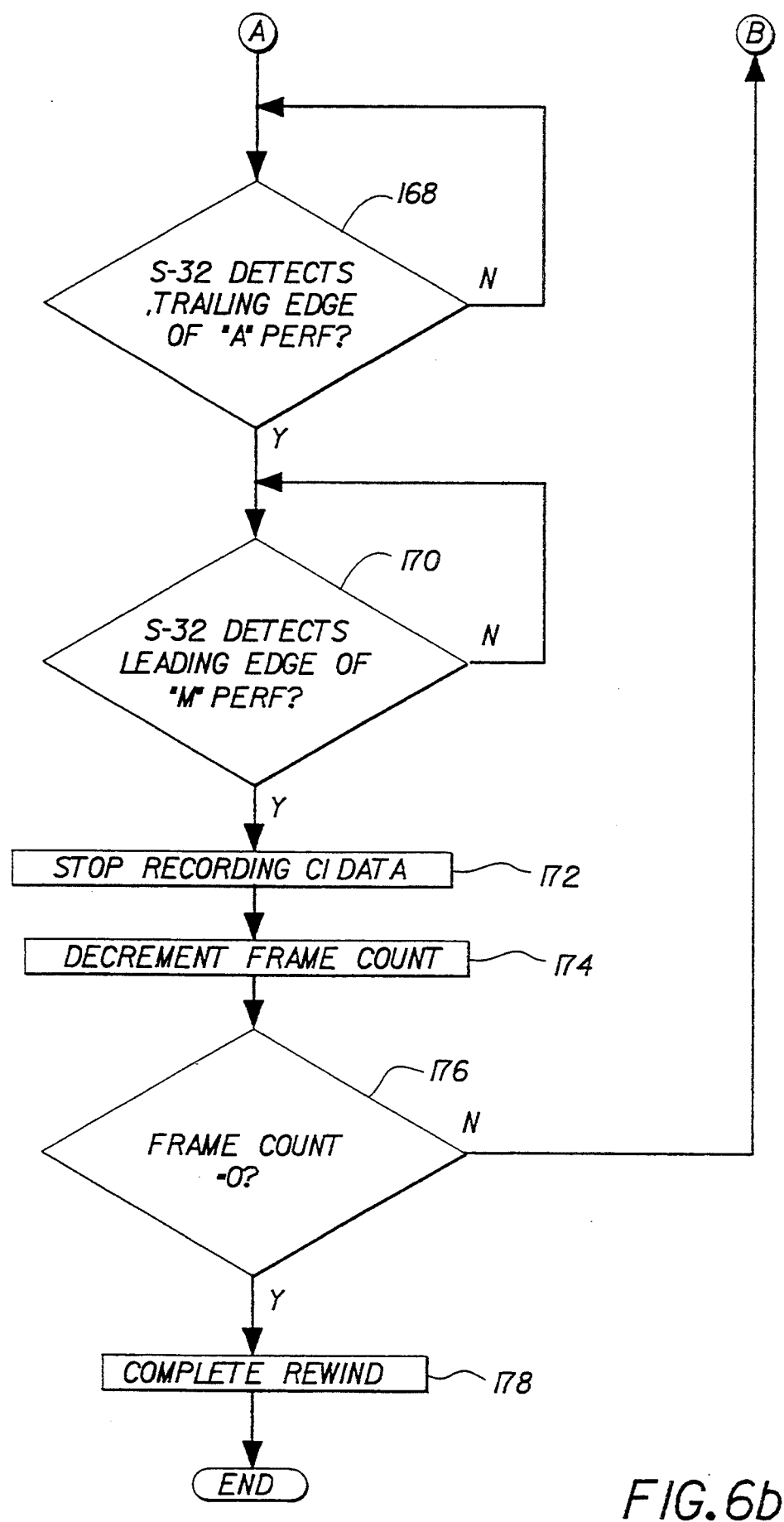

At step 104, the controller fetches the first data set which is preferably the high content annotation data to be recorded in track C2 adjacent frame 25(2). The film advances until step 106 determines that the sensor 34 has detected the A perf. At step 108, the width of the A perf is measured and, at step 110, a data recording frequency is calculated based on the velocity information derived at step 108. At this point, as shown in FIG. 3b, the film is in position for head 40 to begin recording the first data set in track C2. The data recording is initiated at step 112. This continues as shown in FIG. 3c until step 116 detects the A perf and step 118 stops recording the C2 data. The A perf width is measured at step 120 (FIG. 3d) and step 122 then begins to slow the transport speed in anticipation of the arrival of metering perf M. When step 124 determines that sensor 32 detects the trailing edge of perf M, step 126 stops the transport motor and the film comes to rest with the frame 25(3) positioned in the exposure gate and with the relative positions of the sensors, perfs and record head (for frame 25(3)) the same as shown in FIG. 3a for frame 25(2).

Referring jointly to FIGS. 4a–4e and 6a–6b, there will now be described the manner in which data is recorded in track C1 during rewind of film back into the cassette. When all image frames have been exposed, the controller program (FIG. 6a) enters the rewind cycle at step 150 and initiates the film transport motor in the rewind direction at step 152. As shown in FIG. 4a the film rewind operation is assumed to have progressed to the point at which image frame 25(3) has just moved past record heads 40,42 in the direction of arrow 26 and recording of data has been completed in track C1 adjacent image frame 25(3). Step 154 executes a read of data from EEPROM 141 and step 156 prepares the data for recording, which preferably includes the appropriate instruction for re-sequencing the data bits as described above. As the rewind progresses, query 158 determines when sensor 32 detects the trailing edge of metering perf M and query 160 determines when, as shown in FIG. 4b, sensor 32 detects the leading edge of anticipation perf A. Steps 162 and 164 then measure the distance between the two perfs and calculate a data recording frequency whereupon step 166 begins recording of data by record head 42 in track C1.

As shown in FIG. 4c data continues to be recorded until at FIG. 4d queries 168 and 170 determine that the leading edges of the A perf and the M perf are detected by sensor 34 (FIG. 4e), following which step 172 stops recording of the C1 data and step 174 decrements the frame counter by one count. This process is repeated frame-by-frame until query 176 determines that all frames have been rewound, in which event the program moves to step 178 which completes the rewind process, typically by assuring that the film has been completely rewound into the cassette and then disabling the film transport motor.

Due to the particular physical alignment of the sensor 32 as determined for film metering purposes in the illustrated embodiment, it will be noted (FIG. 4c) that recording in data track C1 commences at a slightly delayed time corresponding to sensor 32 detecting the leading edge of perf A (FIG. 4b). The result is a slightly reduced available length of the data track for recording purposes and consequent reduction in the maximum number of bytes that can be recorded in this track. This result can be eliminated in the case of a dual track recording head by offsetting the head recording track for the C1 data track to the right, as shown in FIG. 7, by an amount necessary to assure that recording is commenced physically at the first available position in the frame area alloted to recording of data tracks. Similarly, in the case of movable single track recording head, the head can be translated at an angle to position the recording track at the desired optimum position for commencement of recording of data track C1.

It will be appreciated from the foregoing that what has been described is a simple and effective mechanism and method for recording data in separate parallel data tracks, first one track C2 in a film advance direction and then a second track C1 in a reverse rewind direction. The process utilizes existing film metering sensors and recording media in the camera without the addition of special devices. Operation of only one recording head in each direction simplifies the complexities of the recording process. By such an arrangement, recording of high content data is accomplished on a frame-by-frame basis during film advance and low content data is stored for recording during rewind thus minimizing the amount of data storage required for the delayed recording.

The invention has been described in detail with particular reference to a presently preferred embodiment, but it will be understood that variations and modifications can be effected within the scope of the invention as set forth in the claims appended hereto.

PARTS LIST 10 camera controller
12 input device
14 EEPROM
16 motor drive
18 film cassette
20 takeup spool
22 photographic film
24 film advance direction
25 image frames
26 film rewind direction
30 detector circuit
32 A perf opto sensor
34 M perf opto sensor
40 recording head (C2)
42 recording head (C1)
44 recording head drive
50 single recording head
60 offset recording head
A anticipation film perf
M metering film perf
C1 low content data track
C2 high content data track

What is claimed is:

1. A method of recording, in a camera, first and second sets of photographic data by means of a magnetic recording device into parallel data tracks in a magnetic recording layer formed on photographic film, the method comprising the steps of:
    recording a first data set associated with an image frame in a first data track on the film as the film is transported in a first direction; and
    recording a second data set associated with said image frame in a second data track on the film as the film is transported in a second direction opposite to the first direction.

2. The method of claim 1 wherein said data sets are each comprised of an initial sequence of digital data bits, the sequence being the same for both data sets and wherein the data bits are recorded in one data track in reverse sequence from the sequence in the other data track such that, upon subsequent reading of the data, both data sets are readable simultaneously in the initial bit sequence while the film is being transported in a single direction.

3. The method of claim 1 or 2 wherein the data sets are recorded in discrete, longitudinally separated track segments adjacent each respective image frame with which the data sets are associated, the first data set being recorded after exposure of the associated image frame as the film is advanced to the next available image frame and the second data set for the associated image frame as the film is being rewound into a film cassette.

4. Photographic camera apparatus for magnetically recording data associated with an exposed film image frame in a plurality of parallel data tracks in a magnetic layer formed on photographic film, the apparatus comprising:
    means for storing and supplying first and second sets of data to be recorded in said parallel data tracks;
    means for transporting said film in forward and reverse directions;
    magnetic recording means for recording said data in said magnetic layer as said film is transported past said recording means;
    means for actuating said recording means to record said first data set after exposure of an associated image frame as the film is advanced in the forward direction to the next available image frame and for actuating said recording means to record said second data set for the associated image frame as the film is transported in said reverse direction.

5. The camera apparatus of claim 4 wherein said data sets are each comprised of an initial sequence of digital data bits, the sequence being the same for both data sets and wherein said apparatus includes means for reversing the sequence of the data bits one of the data sets prior to recording on the film such that, upon subsequent reading of the data, both data sets are readable simultaneously in the initial bit sequence while the film is being transported in a single direction.

6. The camera apparatus of claim 4 wherein said actuating means is operative to record said first and second data sets in discrete, longitudinally separated track segments adjacent each respective image frame with which the data sets are associated, the first data set being recorded as the film is transported in the advance direction toward the next available image frame, the camera apparatus further including means for sensing during reverse transport of the film when the an image frame associated with a second data set to be recorded is in position for recording by said recording means; and said actuating mean is responsive to said sensing means to record said second data set in a track segment adjacent to the associated image frame.

7. The camera apparatus of claim 4 wherein said recording means comprises a dual track recording head and said actuating means actuates one recording track when recording in the forward direction and the other recording track when recording in the reverse direction.

8. The camera apparatus of claim 4 wherein said recording means comprises a single track recording head and said apparatus further includes means for displacing said head over one of said data tracks when recording in the forward direction and over the other of said recording tracks when recording in the reverse direction.

9. The camera apparatus of claim 4 wherein said recording means comprises a dual track recording head with one recording head track offset in the longitudinal recording direction from the other recording head track to enable start of recording at a predetermined position in the data track corresponding to said offset recording head track which maximizes available recording space in said data track corresponding to the offset recording head track.

* * * * *